(12) United States Patent
Schünemann et al.

(10) Patent No.: US 12,103,510 B2
(45) Date of Patent: Oct. 1, 2024

(54) ELECTRIC BRAKE SYSTEM FOR VEHICLES

(71) Applicant: ZF CV Systems Global GmbH, Bern (CH)

(72) Inventors: Gerd Schünemann, Laatzen (DE); Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 296 days.

(21) Appl. No.: 17/721,128

(22) Filed: Apr. 14, 2022

(65) Prior Publication Data

US 2022/0234558 A1 Jul. 28, 2022

Related U.S. Application Data

(63) Continuation of application No. PCT/EP2020/080634, filed on Nov. 2, 2020.

(30) Foreign Application Priority Data

Nov. 8, 2019 (DE) ...................... 10 2019 130 233.1

(51) Int. Cl.
*B60T 8/88* (2006.01)
*B60T 8/17* (2006.01)
(Continued)

(52) U.S. Cl.
CPC ............ *B60T 8/885* (2013.01); *B60T 8/1701* (2013.01); *B60T 13/662* (2013.01); *B60T 13/74* (2013.01);
(Continued)

(58) Field of Classification Search
CPC ...... B60T 8/855; B60T 8/1701; B60T 13/662; B60T 13/74; B60T 2201/03;
(Continued)

(56) References Cited

U.S. PATENT DOCUMENTS

| | | |
|---|---|---|
| 2008/0021623 A1 | 1/2008 | Frey et al. |
| 2017/0210365 A1 | 7/2017 | Luelfing et al. |

(Continued)

FOREIGN PATENT DOCUMENTS

| | | |
|---|---|---|
| CN | 106458196 A | 2/2017 |
| CN | 107921945 A | 4/2018 |

(Continued)

OTHER PUBLICATIONS

Translation and Written Opinion of the International Searching Authority dated Feb. 22, 2021 for international application PCT/EP2020/080634 on which this application is based.

(Continued)

*Primary Examiner* — Jacob M Amick
(74) *Attorney, Agent, or Firm* — Walter Ottesen, P.A.

(57) ABSTRACT

An electric brake system for a vehicle is provided, wherein the vehicle has a brake value encoder, at least one first axle having at least two wheels and a second axle having at least two wheels. A first axle modulator is associated with the first axle. A second axle modulator is associated with the second axle. A single central control unit is further provided, which generates and outputs a first brake signal for the first axle modulator and a second brake signal for the second axle modulator as a function of a brake signal from the brake value encoder or as a function of a further brake request. The first and second axle modulator are each configured to decelerate the wheels of the first and second axle as a function of the first and second brake signal from the central control unit.

12 Claims, 2 Drawing Sheets

(51) Int. Cl.
*B60T 13/66* (2006.01)
*B60T 13/74* (2006.01)

(52) U.S. Cl.
CPC ....... *B60T 2201/03* (2013.01); *B60T 2270/10* (2013.01); *B60T 2270/30* (2013.01); *B60T 2270/402* (2013.01); *B60T 2270/413* (2013.01)

(58) Field of Classification Search
CPC ............. B60T 2270/10; B60T 2270/30; B60T 2270/402; B60T 2270/413
See application file for complete search history.

(56) References Cited

U.S. PATENT DOCUMENTS

| | | | |
|---|---|---|---|
| 2019/0248350 A1* | 8/2019 | Wulf | B60T 13/683 |
| 2019/0337503 A1 | 11/2019 | Otremba | |
| 2020/0156601 A1 | 5/2020 | Goers et al. | |
| 2020/0172063 A1 | 6/2020 | Dieckmann et al. | |
| 2021/0347342 A1 | 11/2021 | Van Thiel | |

FOREIGN PATENT DOCUMENTS

| | | |
|---|---|---|
| DE | 10 2004 009 469 A1 | 9/2005 |
| DE | 10 2008 061 944 A1 | 6/2010 |
| DE | 10 2014 006 613 A1 | 11/2015 |
| DE | 10 2017 005 816 A1 | 12/2018 |
| DE | 10 2017 007 788 A1 | 2/2019 |
| DE | 10 2018 126 094 A1 | 4/2020 |
| WO | 2019/034297 A1 | 2/2019 |

OTHER PUBLICATIONS

International Search Report of the European Patent Office dated Feb. 22, 2021 for international application PCT/EP2020/080634 on which this application is based.
English Translation of the Chinese Office action dated May 1, 2024 for corresponding Chinese patent application 202080075625.8.

* cited by examiner

ELECTRIC BRAKE SYSTEM FOR VEHICLES

CROSS REFERENCE TO RELATED APPLICATIONS

This application is a continuation application of international patent application PCT/EP2020/080634, filed Nov. 2, 2020 designating the United States and claiming priority from German application 10 2019 130 233.1, filed Nov. 8, 2019, and the entire content of both applications is incorporated herein by reference.

TECHNICAL FIELD

The present disclosure relates to an electric brake system for vehicles and a method for controlling a brake system for vehicles.

BACKGROUND

Brake systems for vehicles are well known. DE 10 2004 009 469 A1 describes an electronically controlled electromechanical brake control system for a utility vehicle. The vehicle has a front axle having two wheels, a rear axle having two wheels and a service brake for braking the wheels. A brake unit for brake actuation is associated with each of the four wheels. The brake units are electrically controllable. A first central control device is further provided for controlling the brake units. A second central control device is furthermore provided as a redundant control device with respect to the first control device. An axle modulator is associated with each axle, which axle modulator determines a wheel brake command for each wheel on the axle associated therewith from an axle brake command from the central control unit. A dynamic adaptation of the brake commands takes place in the central control units for the purpose of vehicle stabilization.

A brake system with reduced complexity is desired for the improvement of vehicle brake systems.

SUMMARY

It is an object of the present disclosure to provide an electric brake system for vehicles with reduced complexity. An object of the present disclosure is, in particular, to provide an electric brake system for vehicles with reduced costs.

This object can, for example, be achieved by an electric vehicle brake system for a vehicle which has a brake value encoder, at least one first axle having at least two wheels and a second axle having at least two wheels. A first axle modulator is associated with the first axle. A second axle modulator is associated with the second axle. A single central control unit is further provided, which generates and outputs a first brake signal for the first axle modulator and a second brake signal for the second axle modulator as a function of a brake signal from the brake value encoder or as a function of the brake signal from a further brake request (for example, from driver assist systems) which is communicated to the central control unit via a data connection. The first and second axle modulator are each configured to decelerate the wheels of the first and second axle as a function of the first and second brake signal from the central control unit.

An electric vehicle brake system or a brake system for vehicles having only a single central control unit (central module) is therefore provided. An axle modulator is associated with each axle of the vehicle, which axle modulator receives a brake signal from the central control unit in each case and initiates a corresponding deceleration at the wheels of the respective axle. The axle modulator has at least one brake modulator for each of the wheels connected to the axle. The brake modulator acts on the brake actuator so that the wheels are braked.

The central control unit receives a brake signal from a brake value encoder or from an eligible system of the vehicle. The central control unit converts the received brake signal into brake signals for the first and second axle modulator in order to enable deceleration or braking of the vehicle. The axle modulator receives the respective brake signal from the central control unit and converts the brake signal into a signal for the brake actuators via the brake modulators.

According to an embodiment, each axle modulator has an axle control unit and at least two brake modulators. The brake modulators each generate brake modulator signals for controlling the brake actuators and output these signals to the brake actuators, which are provided directly on the respective wheel.

According to an embodiment, the axle modulators receive the brake signal from the brake value encoder as an input signal in addition to the first or second brake signal from the central control unit. The axle modulators use the brake signal from the brake value encoder as an input signal for generating the brake modulator signals if a fault occurs in or at the central control unit.

Accordingly, the brake signal from the brake value encoder is output not only to the central control unit but also to each of the axle modulators. As a result of the axle modulators receiving the brake signal from the brake value encoder, the axle modulators can also enable redundant braking in the event of a failure of the central control unit or in the event of a fault in the line between the central control unit and the respective axle modulators. The safety of the brake system can therefore also be ensured with a reduction in the complexity of the brake system and an associated reduction in costs.

According to a further embodiment, at least one axle modulator signal line is provided between at least two axle modulators. This serves for the communication between the axle modulators, in particular if there is a fault in or at the central control unit. Equalization of the axle brake forces, which can improve the vehicle stability and the brake power, can therefore also take place in the event of a failure of the central control unit.

The disclosure likewise relates to a vehicle, in particular a utility vehicle, having a brake value encoder, at least one first axle having at least two wheels, a second axle having at least two wheels and at least one electric brake system described above.

According to an embodiment, the mass of the vehicle is distributed substantially evenly to the first and second axle. Alternatively, the mass of the vehicle can also be distributed unevenly to the axles.

The disclosure likewise relates to a method for controlling an electric brake system for vehicles, which has a brake value encoder, at least one first axle having at least two wheels and a second axle having at least two wheels. A first axle modulator is associated with the first axle and at least one second axle modulator is associated with the second axle. A first brake signal is generated for the first axle modulator and a second brake signal is generated for the second axle modulator by a single central control unit as a function of a brake signal from the brake value encoder. The wheels of the first and second axle are braked as a function of the first and second brake signal from the central control unit.

While, in the prior art, two central and redundant central control units in the form of central modules of the brake system are provided, the brake system of the disclosure manages with only one single central control unit. The central control unit functions as a central module of the brake system and serves to control and monitor the electrically regulated brake system. A setpoint deceleration of the vehicle is determined from a signal of the brake value encoder. By way of example, the setpoint deceleration together with the respective wheel speeds of the wheels of the vehicle can be used as an input signal for an electronic regulating system. In the case of an electronically regulated pneumatic brake system, this regulating system determines pressure setpoint values for the brake system at the front axle and at the rear axle. For the electric brake system, the regulating system determines electrical setpoint values for controlling the electric brake actuators. The setpoint values are compared with actual values and differences can be corrected. The central control unit is connected to the axle modules and exchanges data and in particular the respective brake signal for the respective axle modulators.

According to an aspect of the present disclosure, an axle modulator is provided for each axle. The axle modulator represents an axle control unit. The axle modulator can optionally have pneumatic pressure regulating channels.

The axle modulator can have an additional connection for a redundant pneumatic brake circuit.

The axle modulator can have a control unit or a control module, which enable ABS (anti-lock brake system) control of the wheels which are connected to the axle.

BRIEF DESCRIPTION OF THE DRAWINGS

The invention will now be described with reference to the drawings wherein.

DESCRIPTION OF THE PREFERRED EMBODIMENTS

Figure 1:
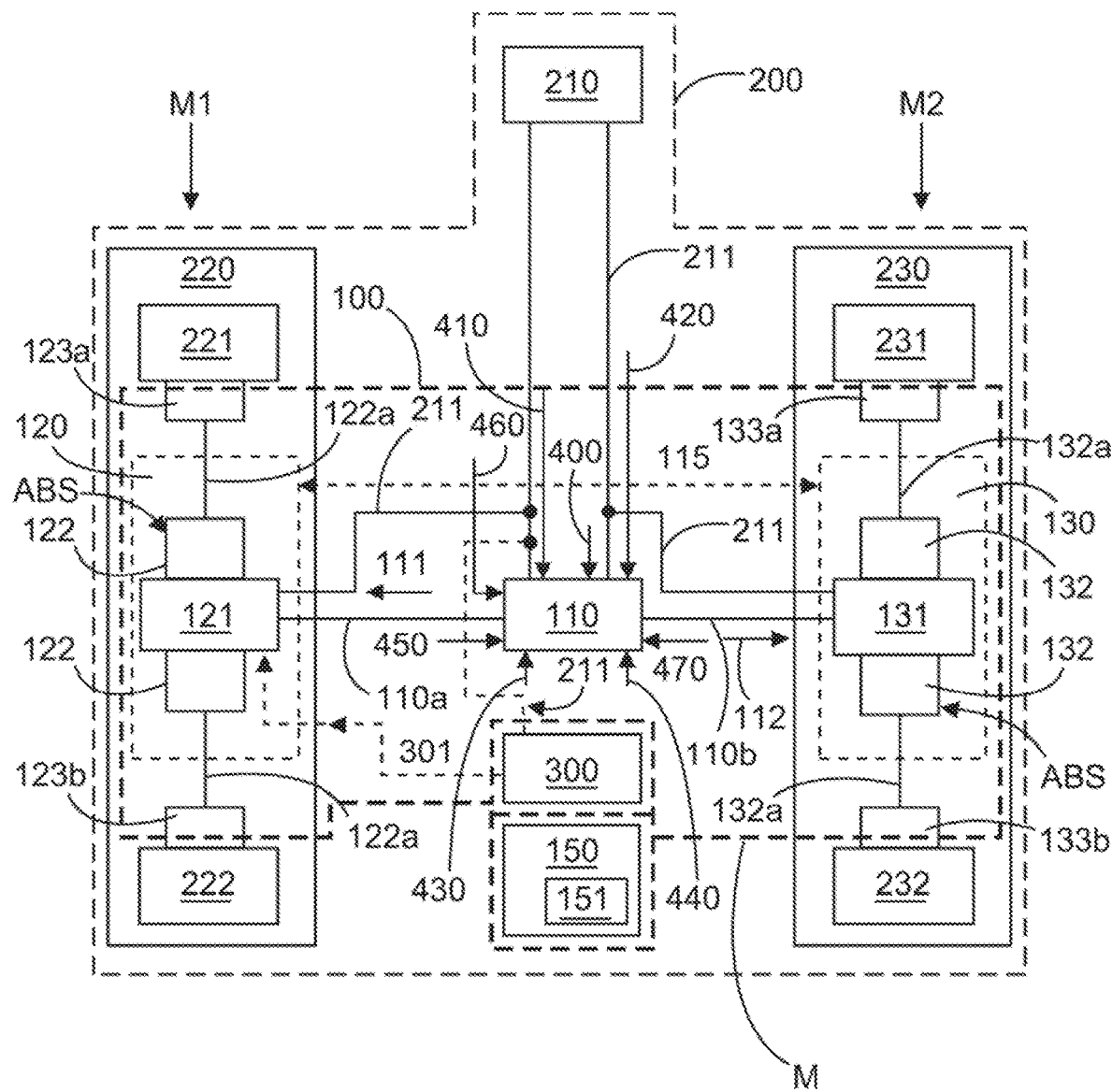
FIG. 1 shows a schematic illustration of a brake system according to a first embodiment; and, FIG. 2 shows a schematic illustration of a brake system according to a second embodiment.

FIG. 1 shows a schematic illustration of a brake system according to a first embodiment. A vehicle 200 (in particular a utility vehicle) has a brake system 100. The vehicle 200 has a brake value encoder 210 and at least two axles 220, 230, each having at least two wheels 221, 222, 231, 232. The wheels 221, 222, 231, 232 can represent driven or non-driven wheels. The brake system 100 according to the first embodiment is configured as an electronically regulated brake system (EBS) for vehicles, in particular utility vehicles. These utility vehicles or vehicles can preferably have a similar mass distribution M1, M2 to the front axle and rear axle. The mass M of the vehicles is therefore substantially not unevenly distributed. Such utility vehicles 200 can be buses or trucks with a loading surface or box body.

According to an aspect of the disclosure, the central control unit can, however, also take into account an uneven axle load distribution. However, a failure of the central control unit then means that a dynamic axle-load-dependent brake force distribution can no longer be ensured. It is, however, possible to cope with the failure of the dynamic axle-load-dependent brake force distribution 470 in vehicles with a typically equal axle load distribution. For other vehicles with an uneven load distribution, an axle modulator signal line 115 may be necessary, via which the axle modulators are able to ensure a brake force distribution.

The brake system 100 has a (single) central control unit 110. The central control unit 110 corresponds, for example, to a central module in an electronic brake system EBS. The brake system 100 has a first and second axle modulator 120, 130. An axle modulator 120, 130, 140 can preferably be provided for each axle 220, 230, 240 of the vehicle 200. The central control unit 110 receives a brake signal 211 from the brake value encoder 210 of the vehicle 200. The brake signal 211 is optionally likewise supplied directly to the at least one first and second axle modulator 120, 130.

In an embodiment, the brake signal from the brake value encoder is provided via a plurality of signal lines, wherein each signal line is connected to a respective axle modulator. All signal lines together are moreover likewise connected to the central control unit.

The axle modulators 120, 130 each have an axle control unit 121, 131 and brake modulators 122, 132 for each wheel which is arranged on the axle.

The first axle modulator 120 receives a first brake signal 111 from the central control unit 110 via the line 110a and the second axle modulator 130 receives a second brake signal 112 from the central control unit 110 via the line 110b.

A brake actuator 123a, 123b, 133a, 133b is provided in or at each wheel 221, 222, 231, 232 of the vehicle, which brake actuator is controlled by the respective brake modulators 122, 132.

For the electronically regulated brake system EBS, a deceleration is determined by the central control unit 110 as a function of the brake signal 211 from the brake value encoder 210 and as a function of vehicle stability programs and/or driver assist systems. The vehicle stability programs and/or driver assist systems can be realized in the central control unit 110 or connected to the central control unit 110, The central control unit 110 then generates a brake signal 111, 112 for each of the axle modulators 120, 130. The axle modulators 120, 130 convert this brake information into signals for the respective brake actuators 123a, 123b, 133a, 133b via the brake modulators 122, 132.

The axle modulators 120, 130 optionally receive not only the first and second brake signal 111, 112 from the central control unit 110, but also the brake signal 211 directly from the brake value encoder 210. This takes place in order to provide a safety redundancy, in particular for the event that the central control unit or the signal lines 110a, 110b are disrupted. Should this occur, based on the brake signal 211 received directly from the brake value encoder 120, 130, the axle modulators 120, 130 can then control the respective brake actuators 123a, 123b, 133a, 133b accordingly via the brake modulators 122, 132 in order to enable braking of the vehicle.

The brake actuators can be driven or actuated hydraulically, pneumatically or electrically.

If, in the event of a fault, the central control unit 110 and/or the signal lines 110a, 110b are defective, the axle modulators initiate deceleration of the vehicle based on the brake signal 211 and optionally taking into account brake force distribution parameters.

In the event of a fault (defect of the central control unit 110 or the signal line 110a, 110b), the axle modulators can also effect a deceleration of the vehicle without the central control unit 110. However, this then also means that it is not possible to also take into account the vehicle stability program 410 and/or driver assist systems 420 which are realized or taken into account by the central control unit 110.

Each axle modulator 120, 130 is associated with an axle 220, 230 of the vehicle 200. The axle modulators 120, 130 can preferably be provided in, on or in the vicinity of the respective axle 220, 230. Each axle modulator 120, 130 has an axle control unit 121, 131, two brake modulators 122, 132 and electromechanical brake actuators 123a, 123b, 133a, 133b. The brake modulators have optionally electric or electronic switch units for controlling and transmitting power to the electromechanical brake actuators.

According to an aspect of the present disclosure, a third an axle modulator signal line 115 is optionally provided between the first and second axle modulator 120, 130. In the event of a fault 430 (failure of the central control unit 110), the axle modulators 120, 130 could therefore communicate with one another in order to be able to realize a desired deceleration of the vehicle. In this case, it is not only possible to also take into account the brake force distribution parameters, but for a brake force distribution 470 to also take place depending on the situation, with the aim being the best possible vehicle deceleration with the best possible vehicle stability. This is beneficial in particular in vehicles with an uneven weight distribution M1, M2. In the event of such a fault 430, vehicle assist systems 410 and vehicle stability systems 420 cannot also be taken into account since these are only processed or taken into account by the central control unit 110.

The brake modulators 122, 132 output a brake modulation signal 122a, 132a to the brake actuators 123a, 123b, 133a, 133b, which causes the brake actuators 123a, 123b, 133a, 133b to implement a desired deceleration or a desired braking.

According to an aspect of the present disclosure, the brake actuators 123a, 123b, 133a, 133b can be controlled electrically. This is advantageous since there is no need for further or additional intelligence to be present in the brake actuators and in the brake modulator. This is in particular advantageous with regard to the reliability of the brake modulators and the brake actuators. In particular, these are less susceptible to shocks and weather influences and temperature influences.

According to an aspect of the present disclosure, the respective axle modulators 120, 130 optionally comprise all of the electronics required for determining the respective brake signals and controlling the brake actuators. Since the axle modulators 120, 130 are provided in, on or in the vicinity of the axle 220, 230, they are less exposed to the weather influences than electronics which are integrated in or on the wheel.

The brake system 100 further has an energy supply unit 150. This energy supply can be connected to an energy supply of the vehicle and has a previously specified storage option to enable the brake system to still be supplied with energy in the event of a fault. In particular, the energy supply unit 150 can have multiple rechargeable accumulators 151.

The axle modulators 120, 130 and in particular the axle control unit 121, 131 are optionally suitable for implementing ABS (anti-lock brake system) regulation independently of the central control unit 110.

The brake system 100 can optionally have a redundant brake unit 300 (for example, a pneumatic brake circuit), which operates independently of the central control unit 100 and enables at least emergency braking in the event of a fault in or at the central control unit 110. To this end, the brake unit 300 can be coupled to the axle modulators 120, 130, 140 via lines 301, 302, 303. The axle modulators can therefore have an additional connection for a redundant pneumatic brake circuit. Alternatively, the brake unit 300 can also be coupled directly to the brake modulators or the brake actuators.

Figure 2:
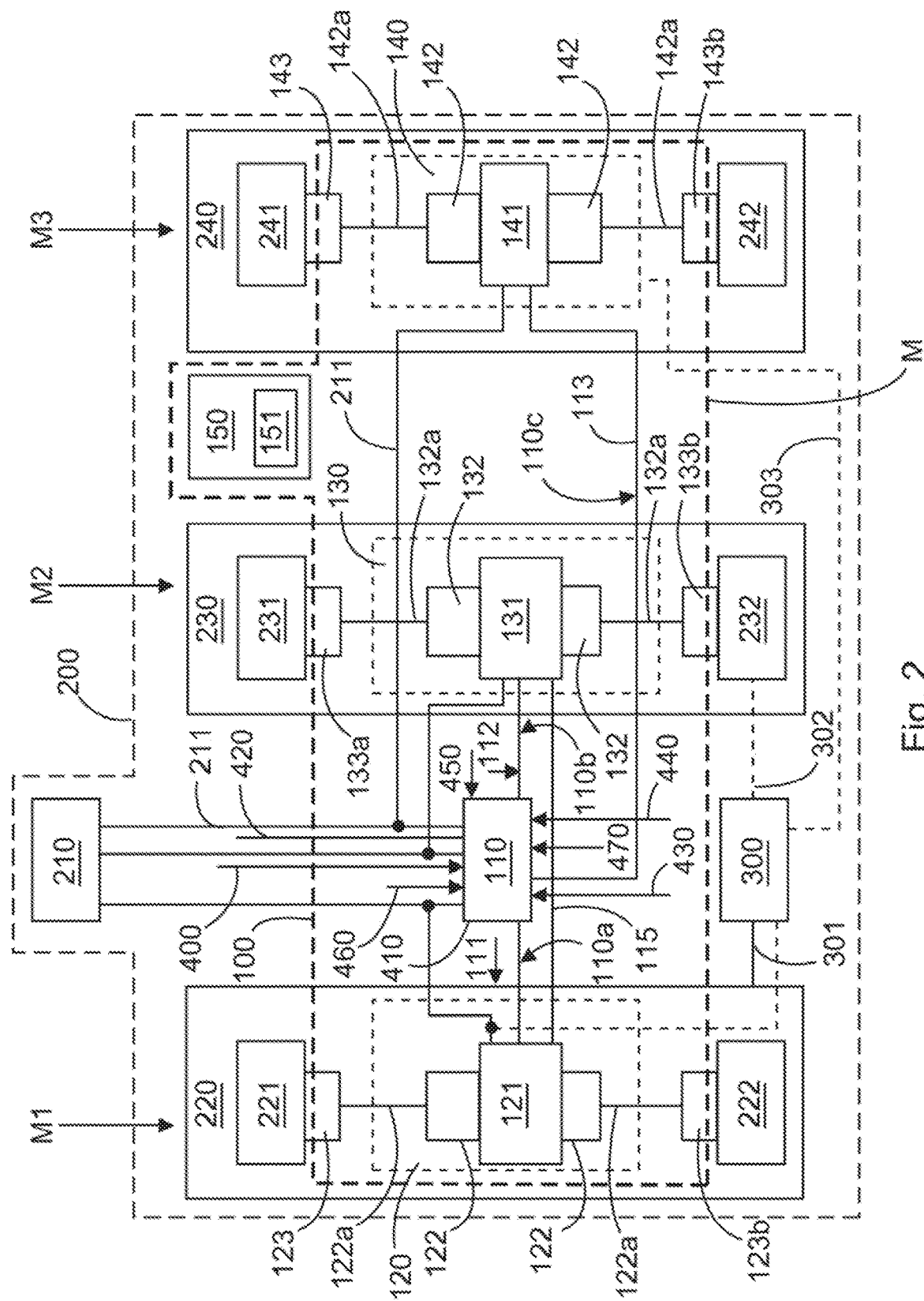

FIG. 2 shows a schematic illustration of a brake system according to a second embodiment. The brake system according to the second embodiment corresponds substantially to the brake system according to the first embodiment, wherein the vehicle has three axles 220, 230, 240. The brake system according to the second embodiment therefore has three axle modulators 120, 130, 140. The configuration of the respective axle modulators according to the second embodiment corresponds to the configuration of the axle modulators according to the first embodiment. Each axle modulator therefore receives a brake signal 111, 112, 113 from the central control unit 110 and a brake signal 211 from the brake value encoder 210. The axle modulator signal line 115 can optionally extend between adjacent axle modulators 120, 130, 140, so that the axle modulators can communicate with one another via the axle modulator signal line 115, in particular in the event of a fault.

It is understood that the foregoing description is that of the preferred embodiments of the invention and that various changes and modifications may be made thereto without departing from the spirit and scope of the invention as defined in the appended claims.

LIST OF REFERENCE SIGNS AS PART OF THE DESCRIPTION

100 Brake system
110 Central control unit
111 First brake signal
112 Second brake signal
110a First signal line
110b Second signal line
110c Third signal line
115 Axle modulator signal line
120 First axle modulator
121 Axle control unit
121 Brake modulator
122a Brake modulator signal
123a, b Brake actuator
130 Second axle modulator
131 Axle control unit
132 Brake modulator
132a Brake modulator signal
133a, b Brake actuator
140 Third axle modulator
141 Axle control unit
142 Brake modulation
142a Brake modulator signal
143a, b Brake actuator
150 Energy supply unit
151 Rechargeable accumulator
200 Vehicle
210 Brake value encoder
211 Brake signal
220 First axle
221 Wheel
222 Wheel
230 Second axle
231 Wheel
232 Wheel
240 Third axle
241 Wheel
242 Wheel 300 Brake unit
400 Further brake request
410 Vehicle stability program
420 Driver assist program
430 Fault
440 Brake force distribution
450 Emergency brake request
460 Brake force distribution parameter
470 Brake force distribution
M Mass
M1, M2 Mass distribution
ABS Anti-lock brake system

What is claimed is:

1. An electric brake system for a vehicle, the vehicle having a brake value encoder, at least one first axle having at least two wheels, and a second axle having at least two wheels, the electric brake system comprising:
a first axle modulator associated with the first axle;
a second axle modulator associated with the second axle;
a single central control unit configured to generate and output a first brake signal for said first axle modulator and a second brake signal for said second axle modulator as a function of a brake signal from the brake value encoder or as a function of a further brake request;
said first axle modulator and said second axle modulator each being configured to decelerate the at least two wheels of the at least one first axle and the at least two wheels of the second axle as a function of said first brake signal and said second brake signal from said single central control unit; and,
wherein said first axle modulator and said second axle modulator are configured to receive said brake signal from said brake value encoder as an input signal in addition to said first brake signal or said second brake signal from said central control unit and are each configured to use said brake signal from said brake value encoder as a further input signal for generating corresponding brake modulator signals in an event of a fault in or at the central control unit.

2. The electric brake system of claim 1 further comprising:
a plurality of brake actuators, wherein each of the at least two wheels of the first axle and said at least two wheels of said second axle has one of said plurality of brake actuators associated therewith;
each of said first axle modulator and said second axle modulator has an axle control unit and at least two brake modulators; and,
said at least two brake modulators of said first axle modulator and said at least two brake modulators of said second axle modulator each generate brake modulator signals for controlling corresponding ones of said plurality of brake actuators and output these signals to the corresponding ones of said plurality of brake actuators.

3. An electric brake system for a vehicle, the vehicle having a brake value encoder, at least one first axle having at least two wheels, and a second axle having at least two wheels, the electric brake system comprising:
a first axle modulator associated with the first axle;
a second axle modulator associated with the second axle;
a single central control unit configured to generate and output a first brake signal for said first axle modulator and a second brake signal for said second axle modulator as a function of a brake signal from the brake value encoder or as a function of a further brake request;
said first axle modulator and said second axle modulator each being configured to decelerate the at least two wheels of the at least one first axle and the at least two wheels of the second axle as a function of said first brake signal and said second brake signal from said single central control unit;
an axle modulator signal line between said first axle modulator and said second axle modulator; and,
said axle modulator signal line serving for communication between said first axle modulator and said second axle modulator.

4. The electric brake system of claim 3, wherein said axle modulator signal line serves for communication between said first axle modulator and said second axle modulator in the event of a fault in or at said central control unit.

5. The electric brake system of claim 1, wherein said central control unit is configured to also take into account the further brake request in a form of at least one of vehicle stability programs and driver assist programs when generating said first brake signal and said second brake signal.

6. The electric brake system of claim 1, wherein said first axle modulator and said second axle modulator are each configured to implement an anti-lock brake system control (ABS).

7. The electric brake system of claim 1, wherein the further brake request represents an emergency brake request.

8. The electric brake system of claim 1, wherein said central control unit is integrated in one of said first axle modulator and said second axle modulator.

9. A vehicle comprising:
a brake value encoder;
at least one first axle having at least two wheels;
a second axle having at least two wheels;
at least one electric brake system having a first axle modulator associated with the first axle and a second axle modulator associated with the second axle; said at least one electric brake system further having a single central control unit configured to generate and output a first brake signal for said first axle modulator and a second brake signal for said second axle modulator as a function of a brake signal from the brake value encoder or as a function of a further brake request;
said first axle modulator and said second axle modulator each being configured to decelerate the at least two wheels of the at least one first axle and the at least two wheels of the second axle as a function of said first brake signal and said second brake signal from said single central control unit; and,
wherein said first axle modulator and said second axle modulator are configured to receive said brake signal from said brake value encoder as an input signal in addition to said first brake signal or said second brake signal from said central control unit and are each configured to use said brake signal from said brake value encoder as a further input signal for generating corresponding brake modulator signals in an event of a fault in or at the central control unit.

10. The vehicle of claim 9, wherein the vehicle is a utility vehicle.

11. The vehicle of claim 9, wherein a mass distribution of a mass (M) of the vehicle to said first axle and said second axle is substantially even; or, a brake force distribution corresponding to an uneven weight distribution can be set via brake force distribution parameters; or, a brake force distribution can be provided depending on a situation between said first axle modulator and said second axle modulator via an axle modulator signal line.

12. A method for controlling an electric brake system for a vehicle having a brake value encoder, at least one first axle having at least two wheels and a second axle having at least two wheels, the electric brake system having a first axle modulator associated with the first axle and a second axle modulator associated with the second axle, the method comprising the steps:

generating a first brake signal for the first axle modulator and a second brake signal for the second axle modulator as a function of a brake signal from the brake value encoder via a single central control unit; and, decelerating the at least two wheels of the first axle and the at least two wheels of the second axle as a function of the first brake signal and the second brake signal from the central control unit; and, wherein said first axle modulator and said second axle modulator are configured to receive said brake signal from said brake value encoder as an input signal in addition to said first brake signal or said second brake signal from said central control unit and are each configured to use said brake signal from said brake value encoder as a further input signal for said generating corresponding brake modulator signals in the event of a fault in or at the central control unit.

* * * * *